(12) United States Patent
Le Blanc et al.

(10) Patent No.: US 10,192,579 B2
(45) Date of Patent: Jan. 29, 2019

(54) FLUID DYNAMIC BEARING MOTORS WITH DIFFERENT WIDTH PUMP SEALS AND JOURNAL BEARINGS

(71) Applicant: Seagate Technology LLC, Cupertino, CA (US)

(72) Inventors: Jeffry A Le Blanc, Aptos, CA (US); Troy M Herndon, San Jose, CA (US); Robert A Nottingham, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 440 days.

(21) Appl. No.: 14/797,213

(22) Filed: Jul. 13, 2015

(65) Prior Publication Data

US 2015/0316100 A1    Nov. 5, 2015

Related U.S. Application Data

(63) Continuation of application No. 11/903,435, filed on Sep. 22, 2007, now Pat. No. 9,093,108.

(51) Int. Cl.
| | |
|---|---|
| *F16C 17/10* | (2006.01) |
| *F16C 33/10* | (2006.01) |
| *F16C 33/74* | (2006.01) |
| *G11B 19/20* | (2006.01) |

(52) U.S. Cl.
CPC ........ *G11B 19/2036* (2013.01); *F16C 17/107* (2013.01); *F16C 33/1045* (2013.01); *F16C 33/74* (2013.01); *F16C 2370/12* (2013.01)

(58) Field of Classification Search
CPC ...... F16C 17/107; F16C 33/74; F16C 33/107; F16C 33/1045

USPC ............................................. 310/90; 384/107
IPC .................................. F16C 17/10,33/10, 33/74
See application file for complete search history.

(56) References Cited

U.S. PATENT DOCUMENTS

| | | | |
|---|---|---|---|
| 6,307,291 B1 | 10/2001 | Iwaki | |
| 6,921,996 B2 | 7/2005 | Parsoneault | |
| 7,073,945 B2 | 7/2006 | Aiello | |
| 7,234,868 B2 | 6/2007 | Tiller | |
| 2002/0047396 A1 | 4/2002 | Saichi | |
| 2004/0027018 A1 | 2/2004 | LeBlanc | |
| 2004/0032175 A1 | 2/2004 | Grantz | |
| 2004/0076351 A1 | 4/2004 | Grantz | |
| 2004/0184688 A1 | 9/2004 | Le | |
| 2005/0207060 A1 | 9/2005 | LeBlanc | |
| 2006/0023982 A1* | 2/2006 | Uenosono | F16C 17/107 384/100 |
| 2006/0250040 A1 | 11/2006 | Engesser | |
| 2006/0284504 A1 | 12/2006 | Aiello | |
| 2007/0092172 A1 | 4/2007 | Obara | |

(Continued)

*Primary Examiner* — John K Kim
(74) *Attorney, Agent, or Firm* — Faegre Baker Daniels LLP

(57) ABSTRACT

In certain embodiments, a motor includes a shaft positioned adjacent a sleeve for relative rotation. The sleeve includes a first radial recirculation channel. The shaft and sleeve form first and second gaps. The first gap is configured to form a pump seal, is positioned above the first radial recirculation channel, and has a width measured between the shaft and sleeve. The second gap is configured to form a journal bearing, is positioned below the first radial recirculation channel, and has a width measured between the shaft and sleeve. The width of the first gap is greater than the width of the second gap.

18 Claims, 4 Drawing Sheets

(56) References Cited

U.S. PATENT DOCUMENTS

| | | | |
|---|---|---|---|
| 2007/0140606 A1* | 6/2007 | Feng | F16C 17/026 |
| | | | 384/107 |
| 2008/0292228 A1* | 11/2008 | Yamashita | B21K 1/12 |
| | | | 384/107 |
| 2009/0079283 A1 | 3/2009 | LeBlanc | |
| 2010/0315742 A1* | 12/2010 | Kimura | F16C 17/10 |
| | | | 360/224 |
| 2015/0316100 A1* | 11/2015 | Le Blanc | F16C 33/74 |
| | | | 384/107 |

* cited by examiner

FLUID DYNAMIC BEARING MOTORS WITH DIFFERENT WIDTH PUMP SEALS AND JOURNAL BEARINGS

RELATED APPLICATIONS

The present application is a continuation application of U.S. application Ser. No. 11/903,435, filed on Sep. 22, 2007, the contents of which are incorporated by reference herein in its entirety.

BACKGROUND

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to large magnitudes of mechanical shock as a result of handling. As such, performance and design needs have intensified including improved resistance to a shock event, improved robustness and reduced power consumption.

Disc drive memory systems store digital information that is recorded on concentric tracks of a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft. The read/write heads must be accurately aligned with the storage tracks on the disc to ensure the proper reading and writing of information.

A demand exists for increased storage capacity and smaller disc drives, which has led to the design of higher recording areal density such that the read/write heads are placed increasingly closer to the disc surface. Because rotational accuracy is critical, disc drives currently utilize a spindle motor having fluid dynamic bearings (FDB) between a shaft and sleeve to support a hub and the disc for rotation. In a hydrodynamic bearing, a lubricating fluid provides a bearing surface between a fixed member and a rotating member of the disc drive. Hydrodynamic bearings, however, suffer from sensitivity to external loads or mechanical shock. Fluid can in some cases be jarred out of the bearing by shock events.

Lubricant evaporation can limit the life of a hydrodynamic bearing motor. A sufficient amount of lubricant such as oil must be maintained to offset evaporation losses. The evaporation rate is further accelerated when special low viscosity oils are used to reduce power. The lower viscosity oils generally have a higher rate of evaporation. If a shock event occurs with a motor having an insufficient volume of lubricant, rotating surfaces may come in direct contact with stationary portions. Contact of the rotating surfaces can increase generated acoustic noise and motor run current. The dry surface-to-surface contact may also lead to particle generation or gall and lock-up of the motor during contact. Particle generation and contamination of the bearing fluid may also result in reduced performance or failure of the spindle motor or disc drive components.

SUMMARY

The present invention provides a novel fluid dynamic bearing motor. A fluid dynamic bearing containing fluid is defined between an inner component and an outer component, wherein the inner component and the outer component are positioned for relative rotation. In an embodiment, a central region of the fluid dynamic bearing is situated between a first axial end of the fluid dynamic bearing and a second axial end of the fluid dynamic bearing. A radial gap is defined between the inner component and the outer component, wherein the first axial end of the fluid dynamic bearing has a larger radial gap as compared to the central region of the fluid dynamic bearing. A capillary seal or a grooved pumping seal is situated between the inner component and the outer component, for containing fluid with the fluid dynamic bearing motor. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A system and method are described herein for providing a fluid dynamic bearing (FDB) motor with relatively rotatable components having facing surfaces that are reliably lubricated in case of contact or a shock event. In an embodiment, a recirculation passageway and a fluid reservoir also join to the FDB bearing. The present invention increases robustness of the FDB motor, and reduces sensitivity to external loads or mechanical shock events. The present invention also averts dry surface-to-surface contact of bearing surfaces, and the resulting reduced performance or failure of the motor or disc drive components. The use of diamond-like coating (DLC) on relatively rotatable fluid bearing surfaces may also be reduced or eliminated.

Figure 2:
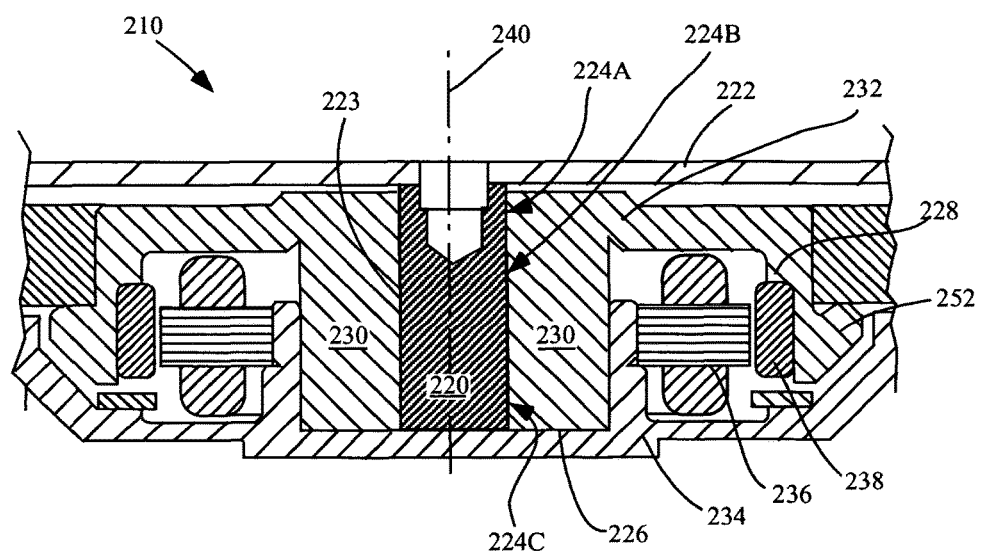
FIG. 2 is a sectional side view of a fluid dynamic bearing spindle motor that can be used in a disc drive data storage system as in FIG. 1, wherein a thrust bearing is utilized at one journal end and a fluid seal is utilized at an opposing end, in accordance with an embodiment of the present invention.

It will be apparent that features of the discussion and claims may be utilized with disc drives, low profile disc drive memory systems, spindle motors, various fluid dynamic bearing designs, hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along an axis of rotation, or along a centerline axis length of the shaft (i.e., along axis 240 of shaft 202 as shown in FIG. 2), and "radially" or "radial direction" refers to a direction perpendicular to the centerline length of the shaft 202. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures and should not be construed as limiting.

Figure 1:
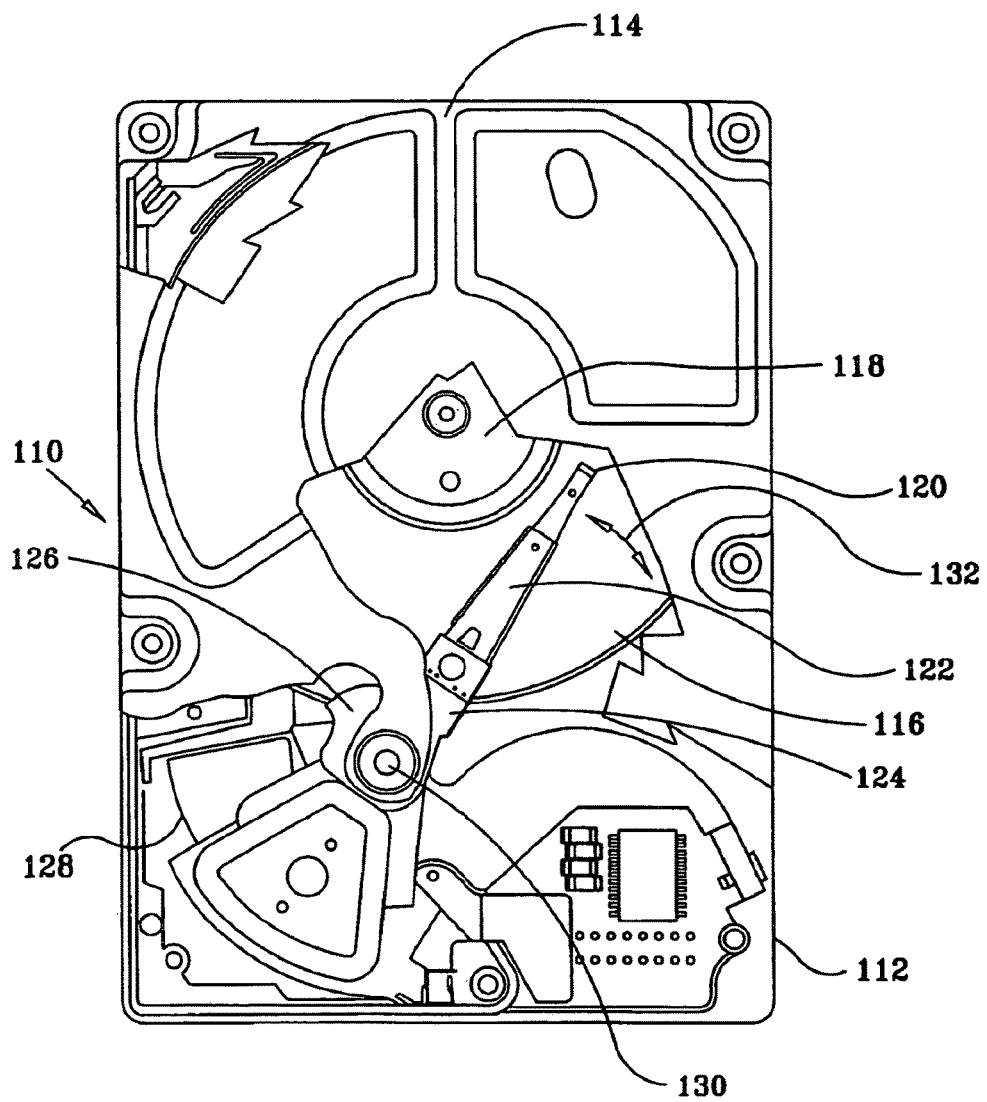
FIG. 1 is a top plan view of a disc drive data storage system in which the present invention is useful, in accordance with an embodiment of the present invention.

Referring to the drawings wherein identical reference numerals denote the same elements throughout the various views. FIG. 1 illustrates a top plan view of a disc drive data storage device 110 in which the present invention is useful. Clearly, as described herein, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a motor design (described in FIG. 2) by disc clamp 118. Disc pack 116 includes a plurality of individual discs, which are mounted for co-rotation about a central axis. Each disc surface has an associated head 120 (a read head and a write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Referring to FIG. 2, a sectional side view is illustrated of a fluid dynamic bearing motor 210 in which the present invention is useful. The fluid dynamic bearing motor 210 is the type that can be used in a disc drive data storage system 110 as in FIG. 1. The motor includes a stationary component and a rotatable component that is relatively rotatable about the stationary component, defining a journal bearing 223 therebetween. In this example, the rotatable components include sleeve 230 and hub 232. Hub 232 includes a disc carrier member, which supports disc pack 116 (shown in FIG. 1) for rotation about shaft 220. Sleeve 230 and hub 232 additionally are affixed to backiron 228 and magnet 238. One or more magnets 238 are attached to a periphery of backiron 228. The magnets 238 interact with a stator winding 236 attached to the base 234 to cause the hub 232 to rotate. Magnet 238 can be formed as a unitary, annular ring or can be formed of a plurality of individual magnets that are spaced about the periphery of hub 232. Magnet 238 is magnetized to form one or more magnetic poles.

In this example, the stationary components include shaft 220 and stator 236, which are affixed to base plate 234. The shaft 220 is affixed to a top cover 222 of the fluid dynamic bearing motor 210. A fluid dynamic journal bearing 223 is established between the rotating sleeve 230 and the stationary shaft 220. A fluid, such as lubricating oil or a ferromagnetic fluid fills interfacial regions between shaft 220 and sleeve 230 as well as between other stationary and rotatable components. While the present figure is described with a lubricating fluid, those skilled in the art will appreciate that useable fluids include a lubricating liquid or gas.

This magnetically biased motor design includes a bearing design that cooperates with the magnetically biased circuit or element to establish and maintain fluid pressure in the bearing areas. The bearing design provides an axial magnetic force, especially in designs where a thrust bearing is defined in a gap at an end of the shaft 220. In the motor illustrated in FIG. 2, a thrust bearing 226 is utilized at one journal end and a fluid seal (described in FIG. 3) is utilized at an opposing journal bearing end. Thrust bearing 226 provides the described axial magnetic force.

Figure 3:
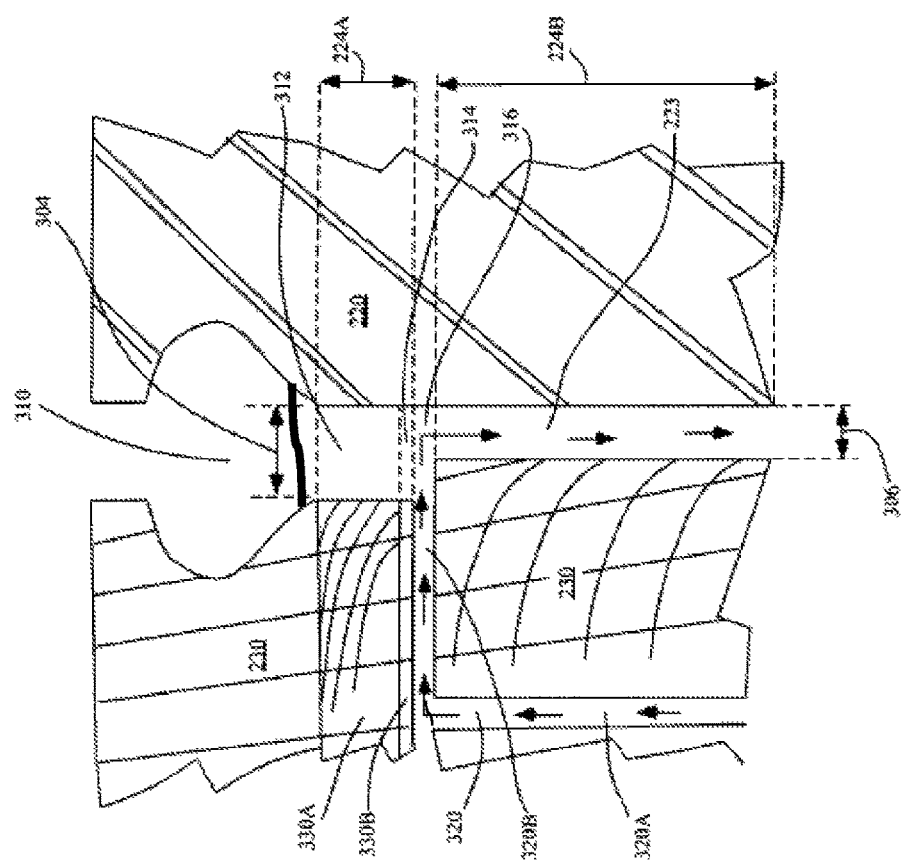
FIG. 3 is a sectional side view of a portion of a fluid dynamic bearing spindle motor taken at an end of a journal bearing, illustrating a first axial end of the journal bearing and a fluid reservoir having a larger radial gap as compared to a central region of the journal bearing, in accordance with an embodiment of the present invention.

Turning now to FIG. 3, a sectional side view is illustrated of a portion of a fluid dynamic bearing spindle motor as in FIG. 2, taken at an end of a journal bearing 223. The journal bearing 223 includes a first axial end 224A, a second axial end 224C, and a central region 224B situated between the first axial end 224A and the second axial end 224C (as more fully illustrated and shown in FIG. 2). Upper radial gap 304 and central radial gap 306 are defined by the journal bearing 223 between the shaft 220 and the sleeve 230. Upper radial gap 304 is defined at first axial end 224A, and central radial gap 306 is defined at central region 224B of the journal bearing 223. In another embodiment, central radial gap 306 is defined at central region 224B and further defined at second axial end 224C. Upper radial gap 304 is structured with a larger radial gap as compared with central radial gap 306. In an embodiment, upper radial gap 304 is established with a radial gap in the range of 10 microns to 20 microns, and central radial gap 306 is established with a radial gap in the range of 1 micron to 6 microns. In a particular embodiment, upper radial gap 304 has a 15 micron radial gap, and central radial gap 306 has a 3 micron radial gap.

A fluid reservoir 310 is also situated between the shaft 220 and the sleeve 230, and is in fluid communication with the journal bearing 223. The first axial end 224A of the journal bearing 223 is situated between the fluid reservoir 310 and the central region 224B of the journal bearing 223. Fluid reservoir 310 is structured with a larger radial gap as compared to central radial gap 306. In an embodiment, fluid reservoir 310 has a tapered radial gap that is radially larger than upper radial gap 304. Alternatively, fluid reservoir 310 is structured with a radial gap equivalent to upper radial gap 304.

In a further embodiment, a fluid recirculation passageway 320 is formed through the sleeve 230 to recirculate fluid through journal bearing 223, and to facilitate purging air from journal bearing 223 via fluid reservoir 310. Fluid recirculation passageway 320 includes axially extending portion 320A and radially extending portion 320B. Radially extending portion 320B fluidly connects to journal bearing 223 between first axial end 224A, and central region 224B of the journal bearing 223. The arrows show an example direction of fluid flow through the fluid recirculation passageway 320 and the fluid dynamic bearing 223. Alternatively, fluid may be caused to flow in the opposite direction. Alternative embodiments of fluid recirculation passageway 320 are described in FIGS. 4A and 4B.

The invention utilizes and makes use of the properties of a grooved pumping seal and a centrifugal capillary seal to contain fluid with the fluid dynamic bearing motor, in an embodiment. The first axial end 224A of the journal bearing 223 includes a grooved pumping surface 330A having a grooved pumping seal zone 312. A grooved pumping surface may alternatively be formed on the surface of the shaft 220, rather than on the sleeve 230. When fluid is situated within pump seal zone 312, grooved pumping surface 330A creates a grooved pumping seal (a high stiffness seal) that pumps fluid toward central region 224B, serving to contain fluid with the fluid dynamic bearing motor.

In yet a further embodiment, the first axial end 224A includes a smooth surface 330B having a centrifugal capillary seal zone 314. A smooth surface is formed on both the shaft 220 and the sleeve 230 between the grooved pump seal surface 330A and the radially extending portion 320B of the recirculation passageway 320. The radial gap at the centrifugal capillary seal zone 314 is a larger radial gap as compared with the radial gap at the central region 224B of the journal bearing 223. A centrifugal capillary seal, defined between shaft 220 and sleeve 230, contained on an end by seal meniscus at the centrifugal capillary seal zone 314, is utilized for containing fluid within the fluid dynamic bearing motor. Fluid within the centrifugal capillary seal zone 314 is forced toward recirculation zone 316 by centrifugal force when shaft 220 and sleeve 230 are in relative rotational motion. Alternatively, a centrifugal capillary seal is defined between shaft 220 and sleeve 230 within fluid reservoir 310, for containing fluid within the fluid dynamic bearing motor.

Further, one of shaft 220 and sleeve 230 includes sections of pressure generating grooves facing the fluid dynamic bearing 223 at the central region 224B, including asymmetric and symmetric grooves, in an embodiment. The groove pattern can include a herringbone pattern or a sinusoidal pattern. These grooves induce fluid flow in the interfacial region of the journal bearing 223 and generate a localized region of dynamic high pressure and radial stiffness. As sleeve 230 rotates, pressure is built up in each of its grooved regions. In this way, shaft 220 easily supports hub 232 for constant high speed rotation.

Figure 4A:
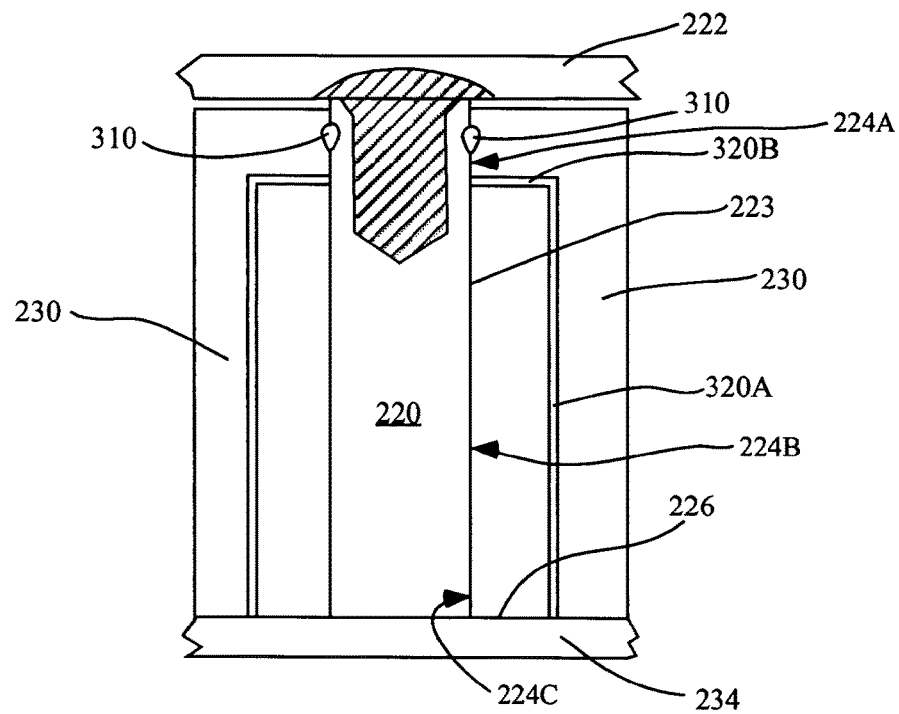
FIG. 4A is a sectional side view of a portion of a fluid dynamic bearing spindle motor, illustrating a fluid recirculation passageway, wherein a first connecting portion of the fluid recirculation passageway connects with the journal bearing between a first axial end of the journal bearing and a central region of the journal bearing, and a second connecting portion of the fluid recirculation passageway connects with a second axial end of the journal bearing via a thrust bearing, in accordance with an embodiment of the present invention.

FIG. 4A is a sectional side view of a portion of a fluid dynamic bearing spindle motor, illustrating a fluid recirculation passageway, in accordance with an embodiment of the present invention. A radially extending portion 320B of the fluid recirculation passageway connects with the journal bearing between a first axial end 224A of the journal bearing and a central region 224B of the journal bearing. A lower portion of the axially extending portion 320A of the fluid recirculation passageway connects with a second axial end 224C of the journal bearing via thrust bearing 226. The thrust bearing 226 is defined between sleeve 230 and baseplate 234.

Figure 4B:
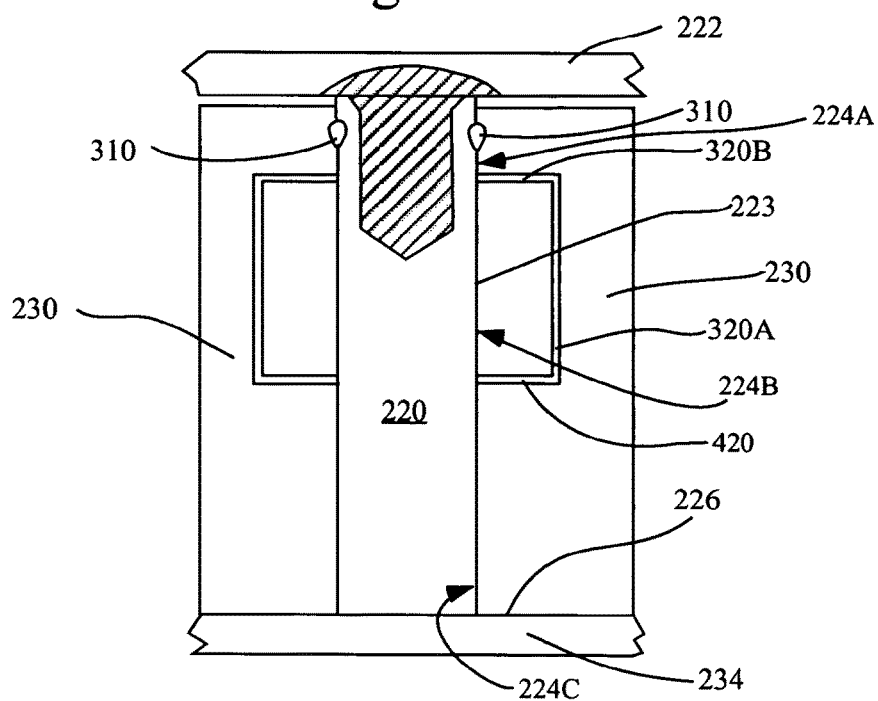
FIG. 4B is a sectional side view of a portion of a fluid dynamic bearing spindle motor, illustrating a fluid recirculation passageway similar to the one shown in FIG. 4A, except that a second connecting portion of the fluid recirculation passageway connects with a central region of the journal bearing, in accordance with another embodiment of the present invention.

FIG. 4B shows another sectional side view of a portion of a fluid dynamic bearing spindle motor, illustrating a fluid recirculation passageway, in accordance with another embodiment of the present invention. In this embodiment the axially extending portion 320A of the fluid recirculation passageway connects to a radially extending portion 420. The radially extending portion 420 of the fluid recirculation passageway connects with the central region 224B of the journal bearing 223.

Modifications and variations may be made to the disclosed embodiments while remaining within the spirit and scope of the invention. The implementations described above and other implementations are within the scope of the following claims.

What is claimed is:
1. A motor comprising:
   a shaft positioned adjacent a sleeve for relative rotation, wherein the sleeve includes a first radial recirculation channel, and wherein the shaft and the sleeve form:
     a first gap containing fluid forming a first seal, positioned above the first radial recirculation channel, and having a width measured between the shaft and the sleeve,
     wherein one of the shaft and the sleeve includes grooves at the first gap configured to pump fluid towards a journal bearing, and
     a second gap containing fluid forming the journal bearing, positioned below the first radial recirculation channel, and having a width measured between the shaft and the sleeve,
     wherein the width of the first gap is greater than the width of the second gap.
2. The motor of claim 1, further comprising:
   a capillary seal positioned above the first recirculation channel and below the first seal.
3. The motor of claim 1, further comprising;
   a fluid reservoir positioned above the first seal.
4. The motor of claim 3, wherein the fluid reservoir defines a third gap having a width larger than the width of the second gap.
5. The motor of claim 3, wherein the fluid reservoir is defined by tapers in the sleeve and the shaft.

6. The motor of claim 1, wherein the width of the first gap is 10-20 microns and wherein the width of the second gap is 1-6 microns.

7. The motor of claim 1, wherein the width of the first gap is 15 micron and the width of the second gap is 3 micron.

8. The motor of claim 1, further comprising:
an axial recirculation channel in fluid communication with the first radial recirculation channel,
wherein the axial recirculation channel is fluidly connected between a thrust bearing and the first radial recirculation channel.

9. The motor of claim 1, further comprising:
an axial recirculation channel; and
a second radial recirculation channel,
wherein the second radial recirculation channel is fluidly connected between the journal bearing and the axial recirculation channel,
wherein the axial recirculation channel is fluidly connected between the first and second radial recirculation channels.

10. The motor of claim 1, wherein the first gap and the second gap share a common axial surface of the shaft.

11. The motor of claim 1, wherein one of the shaft and the sleeve includes grooves at the second gap.

12. A hard drive comprising:
a base;
a motor coupled to the base, wherein the motor comprises:
a shaft positioned adjacent a sleeve for relative rotation, wherein the sleeve includes a recirculation channel, wherein the shaft and the sleeve form:
a first gap containing fluid forming a first seal, positioned above the recirculation channel; and having a width measured between the shaft and the sleeve,
wherein one of the shaft and the sleeve includes grooves at the first gap configured to pump fluid towards a journal bearing, and
a second gap containing fluid forming a the journal bearing, positioned below the recirculation channel, and having a width measured between the shaft and the sleeve,
wherein the width of the first gap is larger than the width of the second gap; and
a hub coupled to the sleeve.

13. The hard drive of claim 12, further comprising:
at least one disc coupled to the hub; and
a cover coupled to the base to form an enclosure.

14. The hard drive of claim 12, further comprising:
a capillary seal positioned above the recirculation channel and defining a meniscus configured to seal the fluid within the motor.

15. The hard drive of claim 12, wherein the recirculation channel includes a radial-extending portion fluidly coupled to the journal bearing.

16. The hard drive of claim 15, wherein the journal bearing contains grooves configured to generate a localized region of dynamic pressure for facilitating rotation.

17. The hard drive of claim 15, further comprising:
an axial recirculation channel in fluid communication with the radial-extending portion of the recirculation channel,
wherein the axial recirculation channel is fluidly connected between a thrust bearing and the first radial recirculation channel.

18. The hard drive of claim 15, further comprising:
an axial recirculation channel fluidly connected between the radial-extending portion of the recirculation channel and another radial-extending portion of the recirculation channel.

* * * * *

UNITED STATES PATENT AND TRADEMARK OFFICE
CERTIFICATE OF CORRECTION

PATENT NO. : 10,192,579 B2
APPLICATION NO. : 14/797213
DATED : January 29, 2019
INVENTOR(S) : Jeffry A. Le Blanc et al.

It is certified that error appears in the above-identified patent and that said Letters Patent is hereby corrected as shown below:

In the Claims

In Column 8, Line 1, Claim 12 delete the second occurrence of "a"

Signed and Sealed this
Twenty-first Day of May, 2019

Andrei Iancu
*Director of the United States Patent and Trademark Office*